US 6,488,733 B2

United States Patent
Kalra et al.

(10) Patent No.: US 6,488,733 B2
(45) Date of Patent: Dec. 3, 2002

(54) METHOD FOR THE FASTER MULTIPLICATION OF EARTHWORMS, AND PRODUCTION OF VERMICOMPOST FROM THE DISTILLATION WASTE OF INDUSTRIAL AROMATIC CROPS

(75) Inventors: Alok Kalra, Lucknow (IN); Sushil Kumar, Lucknow (IN); Neetu Katiyar, Lucknow (IN); Janak Raj Bahl, Lucknow (IN); Ravi Prakash Bansal, Lucknow (IN); Harmesh Singh Chauhan, Lucknow (IN); Arun Prasad, Lucknow (IN); Rakesh Pandey, Lucknow (IN); Om Parkash Dhawan, Lucknow (IN); Alok Krishna, Lucknow (IN); Ramesh Srivastava, Lucknow (IN)

(73) Assignee: Council for Scientific and Industrial Research (IN)

( * ) Notice: Subject to any disclaimer, the term of this patent is extended or adjusted under 35 U.S.C. 154(b) by 68 days.

(21) Appl. No.: 09/751,385

(22) Filed: Jan. 2, 2001

(65) Prior Publication Data

US 2002/0121116 A1 Sep. 5, 2002

(51) Int. Cl.$^7$ .......................... C05F 15/00; C05F 11/02
(52) U.S. Cl. ............................................... 71/23; 71/21
(58) Field of Search ....................... 71/23, 21

(56) References Cited

U.S. PATENT DOCUMENTS

| | | | | |
|---|---|---|---|---|
| 4,211,545 A | * | 7/1980 | Graefe | 71/9 |
| 5,082,486 A | * | 1/1992 | Glogowski | 71/9 |
| 5,458,877 A | * | 10/1995 | Obayashi et al. | 424/195.1 |
| 5,942,022 A | * | 8/1999 | Bislev et al. | 71/9 |
| 6,273,927 B1 | * | 8/2001 | Yang | 71/11 |

FOREIGN PATENT DOCUMENTS

| | | | |
|---|---|---|---|
| DE | 03409019 | * | 9/1985 |
| DE | 4240580 | * | 6/1994 |
| JP | 2000279929 | * | 10/2000 |
| WO | 92/00942 | * | 1/1992 |

OTHER PUBLICATIONS

Kulik et al., Ecology of Industrial Regions, vol. 1, No. 1/2, pp 111–115, 1995.*
Shu et al., T'ee Jang Hsueh Pao, vol. 12, p. 243–52, 1964.*
Chattapodhyay, J. Indian Soc. Soil Sci., vol. 45(3), p. 566–569, 1997.*
Subrahmanyam et al., Fertilizer Research, vol. 31, No. 1., p. 1–4, 1992.*
Chattopadhyay et al. Fertilizer Research, vol. 35, No. 3, p. 177–181, 1993.*

* cited by examiner

Primary Examiner—Chhaya D. Sayala
(74) Attorney, Agent, or Firm—Dinesh Agarwal, P.C.

(57) ABSTRACT

The present invention relates preparation of superior quality vermicompost from the distillation wastes of aromatic crops said method comprises drying of distillation waste for 24 to 72 hours, obtained after the distillation of herbage for 2–3 h. at 20–25lbs of steam pressure, chopping the waste into small pieces, transferring this material into compost pits containing about 7–10 cm layer of partially rotten cowdung and 400–450 earthworms (*Perionyx excavatus*)/m$^3$, daily watering of the pits to keep the plant material moist and covering them with gunny bags to check the loss of humidity, reloading the pits (20–30 cm layer) with the chopped distilled waste after 30–35 days, restricting watering after complete degradation of the added material, harvesting of the dried material and shade drying the same for 4–5 days, and sieving the harvested compost to remove earthworms.

9 Claims, No Drawings

METHOD FOR THE FASTER MULTIPLICATION OF EARTHWORMS, AND PRODUCTION OF VERMICOMPOST FROM THE DISTILLATION WASTE OF INDUSTRIAL AROMATIC CROPS

FIELD OF THE INVENTION

This invention relates to the evolving of an efficient method for the faster multiplication of earthworms and production of superior quality vermicompost from the distillation waste of industrial aromatic crops.

BACKGROUND AND PRIOR ART REFERENCES

Most of the biodegradable organic wastes can be converted in to vermicompost and these include agricultural wastes like weeds, husks, straw, stubble, dung and bio-gas; urban solid wastes like kitchen wastes, waste from vegetable and fruits market yards; agro industry waste like unused pulp and peels of fruits, press-mud, seed husk etc. (Singh and Rai, 1998, *Yojna* 10–12). However, no information is available on production of vermicompost through utilization of wastes of essential oil bearing plants. This is imperative and important in view of the fact that some lakh hectares of land is already under essential oil plant crops and the area under such crops is expected to further grow in near future.

In India, about 3 million tons of distilled waste is produced annually which is of no or limited economic use and remains unutilized and rots in the fields during rains posing a sequel of environmental and health problems. Though, most of the organic wastes can be converted into vermicompost, utilization of distilled wastes of essential oil crops would be a better option for converting this into vermicompost as the same has no or limited economic use, is not consumed by animals as feed and during the process of distillation there is a complete degradation of the plant material and does not require predecomposition.

Experiments have been carried out and a process has been developed for the faster multiplication of earthworms and production of superior quality compost from distilled waste of industrial aromatic crops like scented geranium (*Pelargonium graveolens*), lemongrass (*Cymbopogon flexuosus*), citronella (*C. winterianus*), and menthol mint (*Mentha arvensis*). The compost produced from the distillation waste of said crops is of good quality, at par or even better than the vermicomposts produced from other agricultural wastes.

OBJECTS OF THE INVENTION

The object of the present invention is to develop an efficient method for the faster multiplication of earthworms and production of superior quality vermicompost from the distillation waste of industrial aromatic crops.

Another object of the present invention is to produce high quality composts from the distillation wastes of aromatic crops.

DETAILED DESCRIPTION

Accordingly, the present invention provides an efficient method for the faster multiplication of earthworms and production of superior quality vermicompost from the distillation waste of industrial aromatic crops, where said method comprising steps of:

(a) drying of distillation waste obtained after distillation of herbage for 2–5 hours at 10–40 lbs. steam pressure in open for 10–72 h, (b) chopping the waste into small pieces of at least 15 cm, (c) transferring this material of about 20–30 cm layer into compost pits containing about 7–10 cm layer of partially rotten cowdung and 400–450 earthworms/m$^3$, (d) daily watering of the pits to keep the plant material moist and covering them to check the loss of humidity, (e) reloading the pits about 20–30 cm layer with the chopped distilled waste after 30–35 days, (f) restricting watering after complete degradation of the added material, (g) harvesting of the dried material and shade drying the same for 4–5 days and (h) sieving the harvested compost to remove earthworms.

In an embodiment of the invention wherein the earthworms are selected from the group comprising *Perionyx excavatus*, *Eisenia fetida* and *Eisenia andrie* or others In another embodiment of the invention wherein the distilled waste of the crops are selected from the group comprising scented geranium (*Pelargonium graveolens*), lemongrass (*Cymbopogon flexuosus*), citronella (*C. winterianus*), and menthol mint (*Mentha arvensis*), marigold (Tagetes) sp., patchouli (*Pogostemon patchouli*) or others.

In yet another embodiments of the invention wherein the other types of waste materials used are selected from the group comprising medicinal/spice crop /plants like *Plantago ovata, Papavar someniferum, Coriandrum sativum, Foeniculum vulgarae* or others.

In yet another embodiment of the present invention, the number of worms harvested in the distillate waste is in the range between 6 to 8 times.

In yet another embodiment of the present invention is to obtain the distillate waste conversions to the compost in a shorter period say about 120 days.

In yet another embodiment, the nitrogen content of the vermicompost from the distillate waste is higher than the conventional vermicompost.

In yet another embodiment the nutritive values of the distillate waste is maintained as of the conventional wastes.

In yet another embodiment the nitrogen content, organic carbon content, phosphorus, potassium, and micronutrients like iron of the vermicompost from the distillate waste are higher than the conventional vermicompost.

In yet another embodiment of the invention, the characteristics of vermicompost obtained from distillation wastes of aromatic/medicinal crops are in the range as given below.

| (a) | Days to compost | 3–4 months (drying for 2–3 days) |
|---|---|---|
| (b) | pH | 6.5–7.4 |
| (c) | Organic carbon % | 14.7–19.5 |
| (d) | Nitrogen % | 1.15–1.50 |

-continued

| | | |
|---|---|---|
| (e) | Phosphorus % | 0.30–0.40 |
| (f) | Potassium % | 0.73–0.89 |
| (g) | Iron (ppm) | 874–2429 |
| (h) | Sodium % | 10–31 |
| (i) | Zinc (ppm) | 113–378 |
| (j) | Calcium (ppm) | 10–14 |

The invention is described in details in the examples given below which are provided to illustrate the invention and therefore should not be considered to limit the scope of the present invention.

EXAMPLE 1

A worm bed of 4.5 m long, 1.2 m wide and 0.5 m deep was prepared in a pit. The bottom of the pit was covered with coarse sand (4–5 cm layer) followed by another layer of field soil (4–5 cm) and a layer of partially decomposed cowdung (7–10 cm). The inner sides of the pit were lined with bricks (22×11×7 cm). The worms *Perionyx excavatus* 1200/pit were released into the beds. The dried rice straw chopped into small pieces was placed in the beds, filling the beds to the top. The beds were watered daily and were kept moist. These were turned frequently (at least twice a week) for proper aeration. After 4 months, the well-grown worms (8–10 cm long) were used for composting.

EXAMPLE II

An experiment was conducted to study the suitability of the distilled waste for cultivation/multiplication of worms. The experiment was conducted in cement pots (15"×15"×15") in which a base layer of partially rotten cowdung (200 g) was provided. Fifty worms were added and the pots were loaded with 500 g of agro/distillation waste. Observation regarding the total number of earthworms was recorded 120 days after loading of waste. It was found that the distillation waste of *Cymbopogon winterianus, C. flexuosus* and *Mentha arvensis* are better substrates for multiplication of earthworms as the multiplication was observed to be faster than rice straw, most commonly used substrate for multiplication of worms (Table 1).

TABLE 1

Vermicultivation: Conventional vs. distillation waste

| Plant/distillation waste | Number of worms harvested |
|---|---|
| Rice straw (conventional) | 264 |
| Distillation waste | |
| Cymbopogon winteranus | 297* |
| C. flexuosus | 333* |
| Mentha arvensis | 297* |
| Pelargonium graveolens | 298* |

*differ significantly from conventional (rice straw)

EXAMPLE III

The distillation waste of various aromatic crops like *Cymbopogon winterianus, C. flexuosus, Mentha arvensis, Pelargonium graveolens* were sun-dried for 48 h. The material was chopped into small pieces (not bigger than 15 cm) and were placed into the compost pits/beds as described earlier filling the beds to about 30 cm. About 1200 worms were added to the each bed. The beds were sprinkled with water daily and covered with the wet gunny bags to keep the material moist. Simultaneously beds containing the conventional wastes like rice straw, wheat straw and vegetable wastes were also maintained. After one month, the material was thoroughly turned over and an additional load of 30 cm layer was placed. The beds were again kept moist as described above till the material appeared to be fully composted. The beds were not watered hereafter and after 5–7 days the material was harvested from the pits. The dried bed material was heaped onto a floor and allowed to further dry. The earthworms rapidly crawled down away from light to a relatively moist areas were separated. The top castings, which were almost free from worms, were then sieved with gentle agitation so as to remove the uncomposted material and worms.

It was observed that the compost from distillation waste, in general, was ready for harvest earlier than the compost from conventional sources especially compost from *C. flexuosus, Pelargonium graveolens, Mentha arvensis* and *C. winterianus* (Table 2). This is in addition to the fact that the distillation waste does not require any pre-decomposition. It is therefore an efficient process requiring lesser number of days to compost compare to conventional sources.

TABLE 2

Vermicompost: conventional vs. distilled wastes of aromatic crops (pH, Organic C and macro elements)

| Manure/compost | Days to compost | PH | Organic carbon (%) | Nitrogen (%) | Phosphorus (%) | Potassium (%) |
|---|---|---|---|---|---|---|
| Vermicompost | | | | | | |
| From vegetable market waste | 140 days | 6.9 | 17.0 | 1.00 | 0.32 | 0.70 |
| Rice straw | 130 days | 7.4 | 18.0 | 1.04 | 0.32 | 0.71 |
| Wheat straw | 140 days | 7.2 | 12.0 | 1.09 | 0.26 | 0.67 |
| From distilled waste | | | | | | |
| Lemongrass | 115 days | 7.3 | 14.7 | 1.19 | 0.30 | 0.73 |
| Citronella | 120 days | 6.9 | 16.2 | 1.15 | 0.36 | 0.75 |

TABLE 2-continued

Vermicompost: conventional vs. distilled wastes of aromatic crops
(pH, Organic C and macro elements)

| Manure/compost | Days to compost | PH | Organic carbon (%) | Nitrogen (%) | Phosphorus (%) | Potassium (%) |
|---|---|---|---|---|---|---|
| Geranium | 120 days | 7.4 | 19.5 | 1.50 | 0.40 | 0.87 |
| Menthol mint | 120 days | 7.2 | 19.5 | 1.45 | 0.39 | 0.89 |

EXAMPLE IV

The compost was air-dried and estimation concerning pH, total organic carbon, content of available nitrogen, phosphorus and potassium and micronutrients was carried out. pH values of the composts from both conventional as well as distillation waste did not vary much and ranged from 6.9 to 7.4. The content of organic carbon was, however, higher in the compost produced from aromatic crops (14.7 to 19.5%) compared to 12.0 to 18.0% in composts from conventional sources.

The content of organic C in composts from distillation waste of *P. graveolens* and *M. arvensis* was 19.5%. The distillation wastes of *M. arvensis* and *P. graveolens* were found to be richer in nitrogen, phosphorus, potassium and some essential micronutrients (Table 3). Therefore, the compost from the distillation waste of these two crops is of superior quality.

TABLE 3

Characteristics of the vermicompost produced through conventional and vermiculture means

| | Compost | |
|---|---|---|
| | Vermicompost from conventional sources like wheat, rice and vegetables waste | Vermicompost from distilled waste of aromatic crops |
| Days to compost | 4–5 months (Drying & partial decomposition required) | 3–4 months (drying for 2–3 days) |
| PH | 6.9–7.4 | 6.5–7.4 |
| Organic carbon % | 12.0–18.0 | 14.7–19.5 |
| Nitrogen % | 1.00–1.10 | 1.15–1.50 |
| Phosphorus % | 0.26–0.32 | 0.30–0.40 |
| Potassium % | 0.67–0.71 | 0.73–0.89 |
| Iron (ppm) | 183–860 | 874–2429 |
| Sodium % | 21–27 | 10–31 |
| Zinc (ppm) | 111–198 | 113–378 |
| Calcium (ppm) | 9–13 | 10–14 |

The experiments conducted by us in our laboratory clearly show that distillation waste of aromatic crops can be easily utilized for vermicultivation and the production of vermicompost. The compost produced from distillation waste of *P. graveolens* and *M. arvensis* is of superior quality and has several advantages over the compost produced from conventional sources.

Advantages a) A superior quality compost rich in organic carbon, nitrogen phosphorus, potassium and some micronutrients like iron is produced from the distillation waste especially that from *Mentha arvensis* and *Pelargonium graveolens*.

b) There is a faster multiplication of worms if distillation waste of several crops like *C. winterianus, C. flexuosus* and *Mentha arvensis* are used.

c) Most of the agricultural waste requires 15–20 days pre-decomposition for softening of the material. No pre-decomposition is required in case of distilled waste as by way of steam or hydro distillation of the material at high pressure there is a complete break down of the material and therefore is easily consumed by the worms.

d) Distillation waste retains their nutritive value except essential oil and therefore compost produced from this contain higher concentration of nutrients.

e) Most of the agro-waste conventionally used for the production of vermicompost like rice or wheat straw, vegetable waste etc. can be utilized as animal feed. Distillation waste of aromatic crops is not preferred by animals as their feed and has otherwise no economic value and therefore is considered cheap source for vermicompost.

What is claimed is:

1. A method for multiplication and production of vermicompost from the waste material left over from the distillation of aromatic/medicinal/spice crops/plants selected from the group consisting of scented germanium (*Pelargonium graveolens*), lemon grass (*Cymbopogon flexuosus*), citronella (*C. winterianus*), menthol mint (*Mentha arvensis*), marigold (*Tagetes* sp.), patchouli (*Pogostemon patchoui*), *Plantago ovata, Papavar someniferum, Coriandrum sativum,* and *Foeniculum valugarae*, said method comprising the steps of:

(a) drying the waste material left over from the distillation of herbage in open for 10–72 hours, (b) transferring the dried waste material of step (a) into compost pits containing about 7–10 cm layer of partially rotten cowdung and 350–475 earthworms/m$^3$, (c) daily watering the material of step (b) to keep the plant material moist and covering them to check the loss of humidity, (d) adding after 30 to 35 days, about 20–30 cm layer of a chopped waste material, left over from the distillation of herbage, (e) restricting watering after complete degradation of the added material of step (d), (f) harvesting of the dried material of step (e), followed by shade drying for 4–5 days, and (g) sieving the harvested compost of step (f) to remove earthworms to obtain required vermicompost.

2. A method as claimed in claim 1, wherein the waste material is obtained by distillation of aromatic/medicinal/spice crop/plant in a range of 10 to 40 lbs. of steam pressure for 2 to 5 hours.

3. A method as claimed in claim 1, wherein the waste material is chopped into small pieces.

4. A method as claimed in claim 1, wherein the waste material is maintained as layers of about 20–30 cm thickness.

5. A method as claimed in claim 1, wherein in step (b) the earthworms are selected from the group consisting of *Perionyx excavatus, Eisenia fetida,* and *Eisenia andrie*.

6. A method as claimed in claim 1, wherein the number of worms harvested in the waste vermicompost material is in the range of between 6 to 8 fold.

7. A method as claimed in claim 1, wherein the waste material is converted to compost in about 120 days.

8. A vermicompost produced by the method of claim 1, wherein the waste material comprises:

| | | |
|---|---|---|
| (i) | pH | 6.5–7.4 |
| (ii) | Organic carbon % | 14.7–19.5 |

-continued

| | | |
|---|---|---|
| (iii) | Nitrogen % | 1.15–1.50 |
| (iv) | Phosphorus % | 0.30–0.40 |
| (v) | Potassium % | 0.73–0.89 |
| (vi) | Iron (ppm) | 874–2429 |
| (vii) | Sodium % | 10–31 |
| (viii) | Zinc (ppm) | 113–378 |
| (ix) | Calcium (ppm) | 10–14. |

9. A vermicompost as claimed in claim 8, wherein the waste material is composted for a period of 3–4 months.

* * * * *